Feb. 1, 1966  W. H. HULTGREN  3,232,437
SPIN-ON FILTER CARTRIDGE
Filed March 13, 1963  2 Sheets-Sheet 1
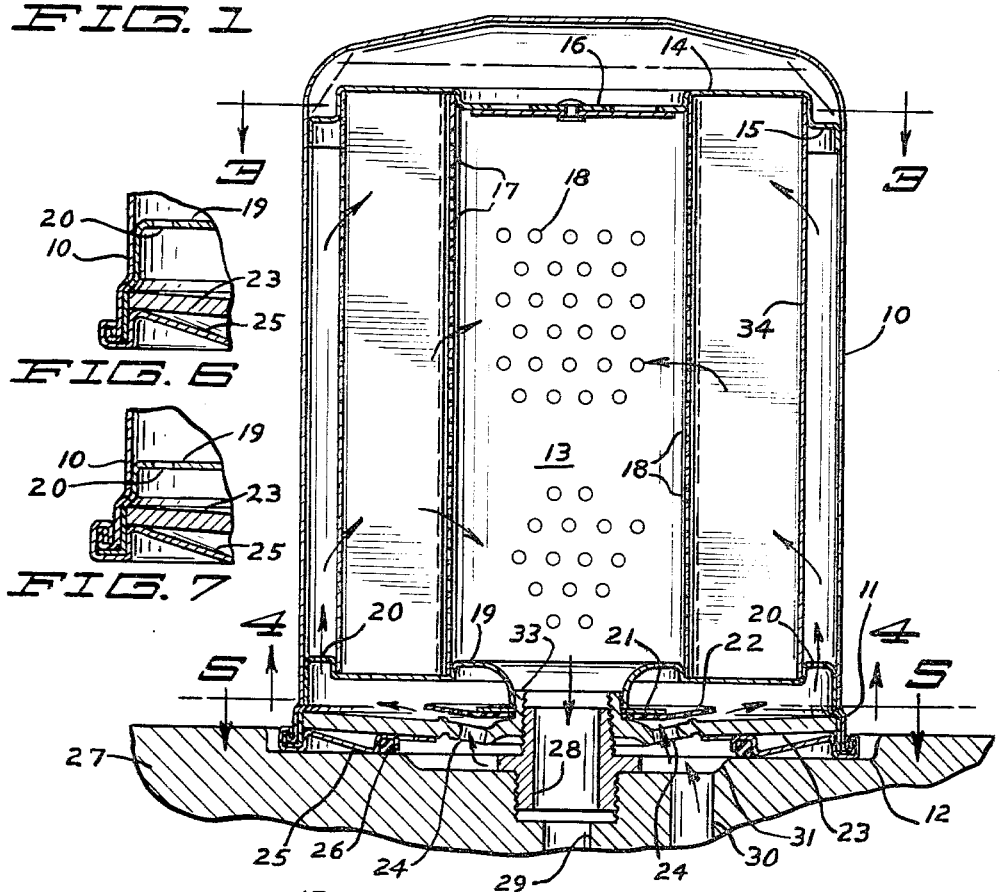
FIG. 1
FIG. 6
FIG. 7
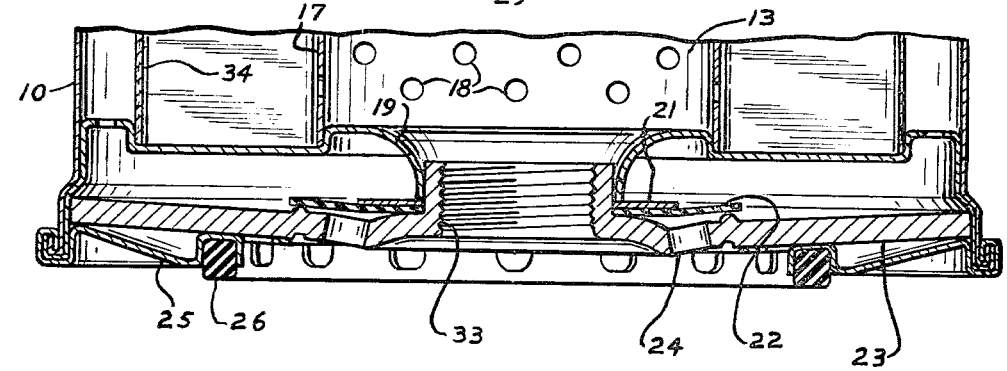
FIG. 2
INVENTOR.
WILLIAM H. HULTGREN
BY
Carlson, Carlson & Sturm
ATTORNEYS Feb. 1, 1966 W. H. HULTGREN 3,232,437
SPIN-ON FILTER CARTRIDGE
Filed March 13, 1963 2 Sheets-Sheet 2
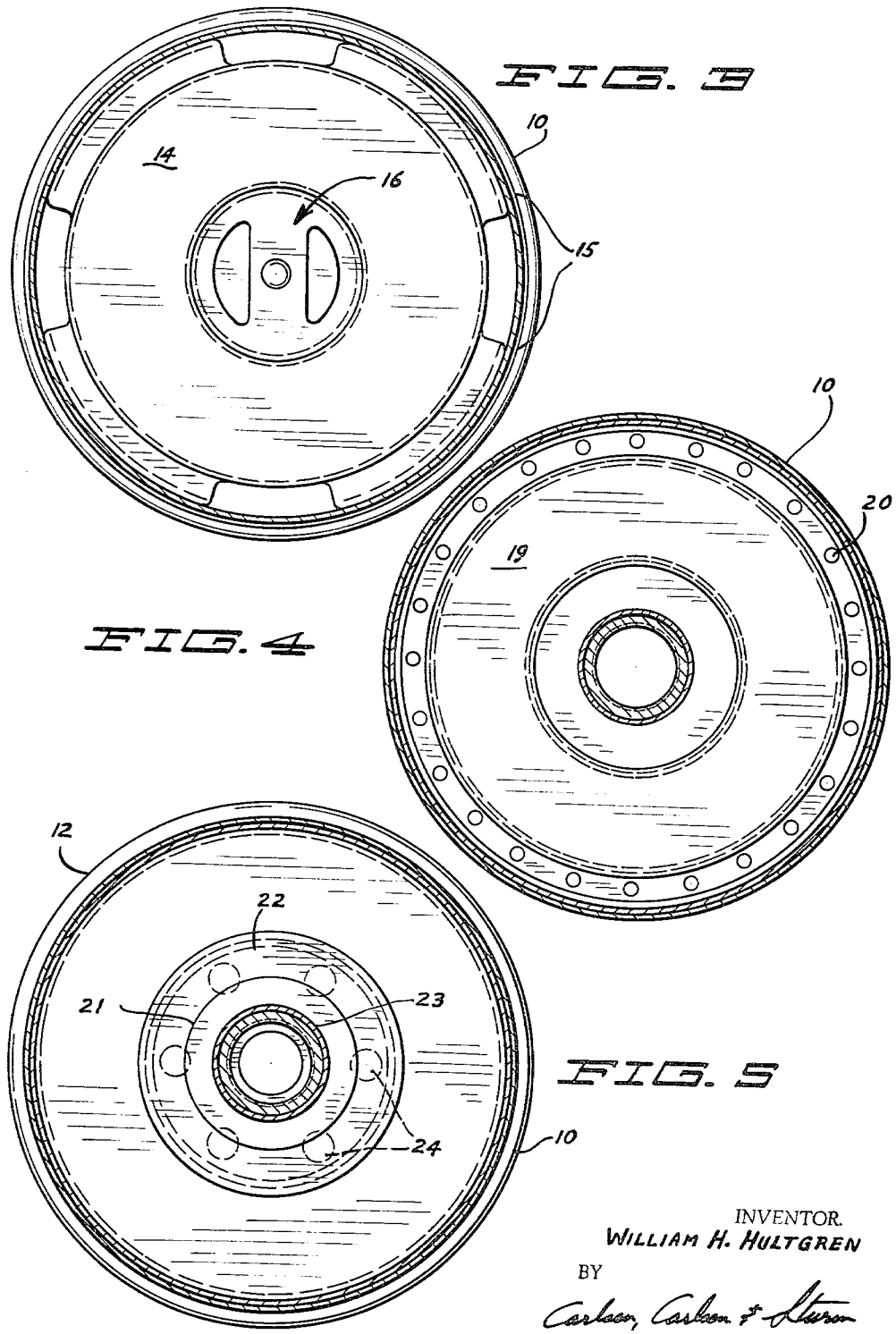
INVENTOR.
WILLIAM H. HULTGREN
BY
ATTORNEYS United States Patent Office 3,232,437
Patented Feb. 1, 1966

3,232,437
SPIN-ON FILTER CARTRIDGE
William H. Hultgren, Mount Carmel, Ill., assignor to Champion Laboratories, Inc., West Salem, Ill., a corporation of Connecticut
Filed Mar. 13, 1963, Ser. No. 264,919
8 Claims. (Cl. 210—440)

This invention relates generally to fluid filter cartridges and is more particularly directed to disposable spin-on type fluid cartridges.

It is an object of this invention to provide an improved disposable fluid filtering cartridge of the type wherein a centrally located threaded port is utilized for mounting the cartridge on a threaded mounting therefor.

Another object of this invention is to provide an improved disposable spin-on type fluid cartridge which may be easily assembled.

A still further object of this invention is to provide an improved disposable spin-on type fluid filtering cartridge which may be more economically manufactured than heretofore obtained.

Another object of this invention is to provide an improved support for a filtering unit in a disposable spin-on type fluid filtering cartridge.

A still further object of the present invention is to provide an improved filter element and support therefor.

With these objects in mind, my invention comprises, in the embodiments to be described below, a filter cartridge of the spin-on disposable type which includes an elongated cylindrical housing which is provided with inlet and outlet ports therefor on a relatively heavy metal end plate suitably attached at the open end thereof and which contains a filter unit which is supported from the same open end of the housing and mounted therein so as to coact with the inlet and outlet ports in the end plate member whereby fluid introduced under pressure flows into the unit, through a filtering media and out through an outlet port therefor.

These and other objects of my invention will become apparent from a consideration of the appended specification, claims and drawing, in which:

FIG. 1 is a sectional side elevational view of a disposable spin-on type filter cartridge in position on a mounting means therefor.

FIG. 2 is a sectional enlarged view of the lower portion of the cartridge of FIG. 1.

FIG. 3 is a sectional view taken along section line 3—3 of FIG. 1.

FIG. 4 is a sectional view taken along section line 4—4 on FIG. 1.

FIG. 5 is a sectional view taken along section line 5—5 on FIG. 1.

FIGS. 6 and 7 are enlarged sectional views of further modified embodiments of one portion of my invention.

Referring now to the drawings in which like elements have been identified with like reference characters, it may be seen that my invention includes generally an open ended cylindrical housing 10 which is closed at one end with a relatively heavy end plate 23 having inlet and outlet ports 24 and 33, respectively, which coact with a co-axially positioned filtering element whereby fluid supplied to the cartridge under pressure is directed radially outwardly of inlet ports 24, proceeds axially along the outside of a filtering assembly 13, and passes through a filtering media 34 into a centrally located perforated tube 18 and back to an outlet port 33 in end plate member 23.

Housing 10 may be comprised of a relatively thin metallic material, such as steel, and is closed at one end and is provided with an annular radially enlarged portion at its open end. The radially enlarged portion includes an inclined, outwardly flaring portion, or surface, for coaction with filter assembly 13 to be described below.

A filter assembly 13 is positioned concentrically inside of housing member 10 and includes a circular top end plate member 14 having a plurality of outwardly projecting lugs 15 adapted to engage the inside of housing 10 and having a pressure relief valve assembly 16 comprised of a disc of resilient material attached to the center of end member 14 for coaction with a pair of openings therein whereby excessive pressure thereacross will cause the member to flex and allow the passage of fluid. Filter assembly 13 also includes a lower end plate member 19 having a downwardly axially extending center portion opening, an annularly located portion for mounting of a filtering media 34, a plurality of openings between the annularly located portion, and a downwardly axially extending peripheral portion which is flared outwardly to coact and engage the inner surfaces of the enlarged annular peripheral portion at the open end of housing 10. An annular filter element 34 of, for example, accordion pleated filter media is positioned intermediate end plates 14 and 19 and is securely attached thereto by suitable fluid sealing adhesive means such as phenolic epoxy adhesive or the like. A central coaxially located perforated tube 17 is positioned radially inwardly of filtering media 34.

Positioned below and in engagement with the downwardly axially extending central and peripheral portions of end plate member 19 is a relatively heavy end plate member 23 which is provided with a centrally located internally threaded outlet opening 33 and a plurality of annularly located inlet openings 24. A check valve assembly comprised of a flexible resilient member 22 and a flexible biasing member 21 is mounted intermediate the lower extremity of the downwardly axially extending center portion of end plate 19 and end plate 23. Positioned below end plate 23 is a further sealing and gasket retaining member 25 which is adapted at its outer periphery to coact with the annularly enlarged portion of housing 10 and to engage end plate member 23 to provide a fluid seal for the assembled fluid filter cartridge. Member 25 is provided with an annular series of tabs which are adapted to engage and hold an annular gasket member 26 which is adapted to coact with a mounting for the filter cartridge assembly and overlies a substantial portion of end plate member 23 so as to provide an effective fluid tight seal with the mounting.

As illustrated in FIG. 1 the disposable fluid filter cartridge assembly is adapted to be mounted upon and coact with a mounting therefor which may be provided on, for example, the block of an internal combustion engine as indicated generally by the reference character 27. A pair of fluid conduits 29 and 30 are provided for connection to a suitable means for supplying fluid under pressure, such as the oil pump in an internal combustion engine, and fluid conduit 29 is positioned to coact with a fluid receiving portion 28 which is threadably secured to mounting means 27 and which is provided with an upwardly extending externally threaded portion to coact with the internally threaded portion of outlet port 33 on end plate member 23 and which is surrounded by an annular depression 31 which is adapted to coact with annularly positioned fluid ports 24 on end plate member 23 so that fluid supplied through conduit 30 may flow upwardly through the filter cartridge assembly and downwardly from the fluid cartridge assembly to conduit 29.

As shown by the arrows in FIG. 1, fluid supplied to the fluid cartridge assembly proceeds upwardly to inlet port openings 24, through the check valve assembly comprised of members 21 and 22, radially outwardly to the outside periphery of the cartridge assembly, axially upwardly and through filter media 34 to the center portion of the filter assembly through perforated tube 17 and axially downwardly to outlet port 33 to return to the fluid system in the internal combustion engine. In the event that the filtering media 34 becomes inoperative, or clogged, the fluid will proceed upwardly to the top end of housing 10 and the pressure across relief valve assembly 16 will allow the fluid to proceed therethrough to outlet port 33 and thence back to the fluid system. The check valve assembly is provided for the prevention of the flow of fluid into the fluid system when there is no pressure available to force the fluid through the filter cartridge assembly.

In FIGS. 6 and 7 further embodiments of my invention are shown which may be utilized in carrying out the principles of my invention under varying conditions and circumstances. In FIG. 6, the downwardly extending peripheral portion of end plate member 19 is coextensive with the enlarged annular portion at the opening of housing 10, and in FIG. 7 the downwardly extending portion of end plate member 19 is dimensioned so as to provide sufficient material to form an integral part of the rolled seal. Upon a thorough consideration of the principles of my invention, it may now be apparent to those skilled in the art that other methods may be utilized for sealing the filter cartridge assembly as, for example, seam welding and the like.

While the illustrated embodiment of my invention shows a plurality of tabs 15 around the periphery of top plate member 14, it may now be appreciated that the filter assembly 13 is supported substantially from lower end plate member 19, and in many applications the tabs 15 may be eliminated while still maintaining substantial mechanical stability. In eliminating the conventional mounting means for the filter assembly, my invention provides a substantial decrease in the cost of manufacture of disposable filter cartridges through a reduced cost of materials and in providing an improved cartridge which may be easily assembled without the use of the customary spring loaded jigs and the like. In such assembly, the filter portion 13 is assembled, check valve members 21 and 22 may be placed on end plate member 23 which is in turn fitted onto the downwardly axially extending central portion of end plate 19, gasket retaining member 25 is placed thereon and the entire assembly is inserted into housing 10 and a suitable rolling operation is performed to complete the assembly of the disposable spin-on fluid filter cartridge.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a spin-on fluid filter cartridge, the combination comprising;
    (a) an open ended cylindrical housing having a radially enlarged annular portion at its open end;
    (b) a self supporting filter unit positioned therein, said filter unit having top and bottom end plate members, said bottom end plate member having a radial dimension substantially equal to the open end of said housing and including at least one inlet port disposed adjacent the periphery of said bottom end plate member between the filter and the housing, a centrally disposed perforated tube member disposed intermediate said end plate members and a continuous concentrically disposed filtering media in sealing engagement with said top and bottom plate members, said bottom end plate member including a centrally axially disposed port; and
    (c) a further axially displaced end plate member, having inlet and outlet ports in fluid communication with the inlet and outlet ports on the bottom end plate member of said self supporting filter unit, said filter end plate member sealingly disposed in the open end of said housing and in engagement with the bottom end plate member on said filter unit and the open end of said housing.

2. The apparatus of claim 1 in which the top end plate member of the filter unit extends into axial slidable engagement with the inside of the cylindrical housing for at least a portion of the periphery thereof.

3. The apparatus of claim 1 in which a pressure responsive relief valve means is disposed on the top end plate member of the filter unit to provide fluid communication intermediate the inlet and outlet ports on the further end plate member.

4. The apparatus of claim 1 in which the open end of the cylindrical housing and the bottom end plate member on the filter unit are provided with complementary radially outwardly inclined surfaces which coact to position the filter unit axially within the cylindrical housing.

5. The apparatus of claim 1 in which the filter end plate member includes a radial, outwardly disposed sealing member adapted to sealingly engage a receptacle for the spin-on fluid filter cartridge.

6. The apparatus of claim 1 in which an asymmetrical flap valve member is disposed on the inlet port on the further end plate member intermediate the further end plate member and the bottom end plate member of the filter unit.

7. A spin-on fluid filter cartridge, comprising in combination;
    (a) an open ended cylindrical housing having a radially enlarged annular portion at its open end;
    (b) a self supporting filter unit positioned therein, said filter unit having top and bottom end plate members, said bottom end plate member having an axially extending skirt portion having a radial dimension substantially equal to the open end of said housing and including at least one inlet port disposed adjacent the periphery of said bottom end plate member and further including a centrally axially disposed port having an axially extending flange portion, a centrally disposed perforated tube member disposed intermediate said end plate members and a continuous concentrically disposed filtering media in sealing engagement with said top and bottom end plate members; and
    (c) a further axially displaced end plate member, having a centrally axially disposed outlet port and a radially displaced inlet port, said outlet port being in fluid engagement with the centrally axially disposed port in said bottom end plate member on said filter unit and said inlet port being in fluid communication with said inlet port disposed adjacent the periphery of said bottom end plate member, said further end plate member being sealingly disposed in the open end of said housing in engagement with the axially extending skirt portion of the bottom end plate member of said filter unit and the radially extending annular portion of said cylindrical housing.

8. The subject matter of claim 7 in which the top end plate member of the filter unit includes a plurality of radially extending ribs adapted to engage the interior of the cylindrical housing so as to maintain the filter unit in substantially concentric disposition with respect to the cylindrical housing and to allow axial displacement therewithin.

References Cited by the Examiner
UNITED STATES PATENTS

| | | | |
|---|---|---|---|
| 1,737,313 | 11/1929 | Kamrath | 210—451 X |
| 2,106,218 | 1/1938 | Krieck | 210—451 X |
| 2,902,162 | 9/1959 | Humbert et al. | |

RUEBEN FRIEDMAN, *Primary Examiner.*

HARRY B. THORNTON, *Examiner.*